United States Patent
Mendiola et al.

(10) Patent No.: US 7,290,041 B2
(45) Date of Patent: Oct. 30, 2007

(54) INSTANT MESSAGING SYSTEM AND METHOD FOR REMOTE NETWORKS USING A SEQUENTIAL MESSAGE HANDSHAKING PROTOCOL

(75) Inventors: Dennis Mendiola, New York, NY (US); Brian Schlotman, Cincinnati, OH (US)

(73) Assignee: Chikka Pte Ltd, Singapore (SG)

( * ) Notice: Subject to any disclaimer, the term of this patent is extended or adjusted under 35 U.S.C. 154(b) by 929 days.

(21) Appl. No.: 09/928,433

(22) Filed: Aug. 14, 2001

(65) Prior Publication Data
US 2002/0026520 A1 Feb. 28, 2002

Related U.S. Application Data

(60) Provisional application No. 60/227,911, filed on Aug. 28, 2000.

(51) Int. Cl.
G06F 15/16 (2006.01)
H04L 12/58 (2006.01)
H04Q 7/20 (2006.01)

(52) U.S. Cl. .............. 709/218; 455/412.1; 455/412.2; 455/466

(58) Field of Classification Search .............. 709/204, 709/206, 217, 218; 455/466, 412.1, 412.2
See application file for complete search history.

(56) References Cited

U.S. PATENT DOCUMENTS 6,714,793 B1 * 3/2004 Carey et al. .............. 455/466

(Continued)

FOREIGN PATENT DOCUMENTS

EP 0 898 431 A1 2/1999
WO WO99 48011 9/1999
WO WO 00 16209 3/2000

OTHER PUBLICATIONS

Applicant Admitted Prior Art as noted within Applicant's specification.*

(Continued)

Primary Examiner—David Wiley
Assistant Examiner—J. Bret Dennison
(74) Attorney, Agent, or Firm—Intellectual Property Law Group LLP; Otto O. Lee; Juneko Jackson (57) ABSTRACT

An instant messaging (IM) system and a method for communicating instant messages between an IM server 11 and a remote communication network utilising a sequential message handshaking protocol across a computer network that is prone to latency and instability. The remote communication network is a GSM network 16 having "Short Message Service" (SMS) for subscribers with mobile GSM devices 18 linked to a "Short Message Server Center" (SMSC) for sending and receiving instant messages remotely of the GSM network 16 and as part of the IM system. The SMSC is provided with an SMSC server 15 connected by a highly stable link 19 with low latency to an SMSC buffer server 14 forming part of the computer network. The SMSC buffer server 14 is connected to the IM server 11 via the internet 13 to complete the computer network. The SMSC buffer server 14 provides for sequential message handshaking that requires and provides a confirmation of receipt of message from the SMSC server 15, and is provided with a buffer to facilitate storage of received instant messages received from the SMSC server 15. Delays are mitigated in the communication of instant messages between the SMSC server 15 and the SMSC buffer server 14, regardless of latency and instability associated with the internet. The SMSC buffer server 14 is also provided with a protocol that doesn't rely upon sequential confirmation of message transfer for communicating messages rapidly via the internet with the IM server, thereby accommodating latency and stability problems associated with the internet.

18 Claims, 3 Drawing Sheets

U.S. PATENT DOCUMENTS

| | | | |
|---|---|---|---|
| 6,938,069 B1* | 8/2005 | Narayanaswamy | 709/204 |
| 2001/0003202 A1 | 6/2001 | Mache et al. | |
| 2001/0003203 A1 | 6/2001 | Mache | |
| 2004/0157586 A1* | 8/2004 | Robinson et al. | 455/412.1 |
| 2004/0171396 A1* | 9/2004 | Carey et al. | 455/466 |

OTHER PUBLICATIONS

U.S. Appl. No. 09/846,249, Instant Messaging Account System, filed May 2, 2001 (including Preliminary Amendment filed concurrently therewith).

U.S. Appl. No. 09/846,376, Method and System for Tracking the Online Status of Active Users of an Internet-Based Instant Messaging System, filed May 2, 2001 (including Preliminary Amendment filed concurrently therewith).

U.S. Appl. No. 09/846,377, Method and System for Inviting and Creating Accounts for Prospective Uses of an Instant Messaging System, filed May 2, 2001 (including Preliminary Amendment filed concurrently therewith).

* cited by examiner

INSTANT MESSAGING SYSTEM AND METHOD FOR REMOTE NETWORKS USING A SEQUENTIAL MESSAGE HANDSHAKING PROTOCOL

This application claims the benefit of priority from U.S. provisional application 60/227,911, filed Aug. 28, 2000.

FIELD OF THE INVENTION

The present invention relates to a computer network based instant messaging system and a method for communicating instant messages between an instant messaging server and a remote communication network that utilises a sequential message handshaking protocol.

The invention has particular utility with instant messaging systems using the internet to communicate instant messages between a plurality of clients or appliances, where at least one of these clients or appliances forms part of a remote communication network such as, but not limited to, a Global System for Mobile Communications ("GSM") network that utilises a sequential message handshaking protocol.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

Instant messaging ("IM") systems have become very popular in recent times with the increasing use of the internet and email by all sectors of the community as a communication medium. With internet use pervading the areas of the domestic market and being taken up by younger, computer-literate generations as a social medium in its own right, a need has arisen for spontaneous and "instantaneous" messages to be exchanged between two or more parties connected to the internet simultaneously. This need has not been able to have been satisfied by the use of traditional email systems and consequently, IM systems have spawned as an alternative or adjunct to email.

"Instantaneous" in the context of IM means the ability to receive messages without prompting a message-handling server. This is in contrast to the way typical emails are sent and received by internet users.

To send and receive e-mail messages, one uses popular personal computer-based email applications such as Eudora™ or Microsoft Outlook™, which employ the Simple Mail Transfer Protocol ("SMTP") and the Post Office Protocol ("POP"). Using POP requires the recipient of an email to query or prompt an email server to which it has subscribed, for messages to download to the user's personal computer ("PC") or any other internet-connected device.

Email messages are sent by a user from an email PC client application (e.g., Eudora™, Microsoft Outlook™) on that user's PC to a mail server to which it has subscribed using SMTP. The mail or SMTP server then forwards the message to the desired recipient's mail server via the internet.

Instant messaging systems work in a different fashion to email, requiring minimal if any user action, to receive messages. Messages are forwarded from a sender's client application, normally a PC-based IM client application program, to the intended recipient's client application via an IM server or directly to the recipient's client, almost in "real time" from the time that a message is sent by the sender, or received by the IM server system—hence "instant". No querying is needed to get a message to its intended recipient, reflecting more of a "pushing" technology, than a "pulling" of information. Examples of some popular IM systems in the market include AOL's AIM™ and ICQ™.

A characteristic of most IM systems is that a client user is able to set up a network of friends or colleagues, more commonly known as "buddies" with or amongst whom messages can be exchanged instantly.

Although current IM systems in the main involve buddy networks set up amongst client users that are PC based, more recently IM systems have been proposed that allow connectivity amongst different client types and different types of IM systems. For example, other client applications may include email-based client applications (eg Eudora™, Microsoft Outlook™) and browser based client applications (eg Internet Explorer™ and Netscape™) on the internet, and also devices connected into a GSM network, such as mobile phones.

GSM networks have their own form of IM system for communicating short textual messages between different subscribers known as "Short Message Service" ("SMS"). With SMS, a "Short Message Service Center" ("SMSC") provides a server through which all SMS messages that are sent and received by client subscribers are handled. The messages are short, typically limited to 160 characters in length, and are sent between subscribers of the GSM network, with the SMSC server processing the messages for delivery to the right destination using the GSM mobile number of the intended receiver. Under the SMS protocol, the textual message from the sender is initially sent to the SMSC server using the cellular telephone network. The SMSC then stores the message and allocates it to the intended recipient for downloading, in accordance with normal GSM protocol, when the recipient is identified to be active within a cell.

SMS messaging is normally only provided between GSM clients that specifically subscribe to it, however, by virtue of the SMSC server, it is possible to connect to the internet using a particular protocol, dependent upon the particular GSM phone and network manufacturer. For example, Nokia™ use Computer Interface Message Distribution protocol version Two (CIMD2).

The CIMD2 protocol, like virtually all SMSC protocols providing connectivity to the internet or other external networks, works on sequential message handshaking. This type of handshaking, in the case of an SMSC sending an IM to an external network, requires a confirmation to be received by the SMSC from the network indicating that the server of the external network has safely received the IM, before another IM will be sent. In the case of an SMSC server receiving an IM from an external network, the converse applies, whereby the SMSC server will not receive another IM until it has sent a confirmation to the external network server that the previous IM received by it has been received.

Thus, only one message at a time can be processed by the SMSC, whereby it must receive confirmation each time that it sends or receives an IM from the server on the external network with which it is communicating. In addition to this sequential handshaking each instant message itself must have its own unique confirmation.

The problem with this type of handshaking is that it does not lend itself to communicating messages rapidly with external networks that are unstable or involve an inherent latency, such as the internet.

As instant messaging systems rely upon the speed at which they convey messages and flexibility in accommodating different client types such as mobile phones connected into a GSM network as attributes in distinguishing them from email, slow communications between an IM server and an SMSC server is highly undesirable and detracts from the virtues of instant messaging.

Whilst the problem can be addressed by creating direct links between the IM server and the SMSC server, in a global IM system such an arrangement would be prohibitively expensive if the IM server was to be centrally located.

Centralisation of the IM server, however, is desirable in a global IM system, where it is preferable to locate the centralised IM server in a tier 1 internet exchange residing in an area of very reliable internet infrastructure such as in the United States of America or Europe. Such location of an IM server provides maximal reliability and redundancy of internet access.

On the other hand, the geographical location and distribution of GSM networks is quite unrelated to the geographical location of tier 1 internet exchanges and consequently stability and latency factors can vary considerably with communications between SMSC servers that can be located in different and indeed quite remote regions of the world, and an IM server located in a tier 1 internet exchange.

DISCLOSURE OF THE INVENTION

It is an object of the present invention to provide for instant messaging between an instant messaging server and a server of a remote network where that server relies upon sequential message handshaking for confirmation of the transmission and receipt of messages at optimum speeds, even in situations where the communication network between the IM server and the server of the remote network is relatively unstable and experiences high latency problems.

It is a further object of the present invention to provide for instant messaging which substantially obviates or alleviates the problems associated with the speed at which messages are communicated between an IM server and an SMSC server of a GSM via the internet.

In accordance with one aspect of the present invention, there is provided in an instant messaging system comprising: an IM server having a plurality of clients with IM client applications of the same or different types, a remote server to which at least one of the clients is connected, a computer network interconnecting the IM server and the remote server to provide IM communications therebetween, wherein the remote server utilises a sequential message handshaking protocol for transmitting and receiving messages to and from the IM server, whereby a confirmation of the successful transmission or receipt of a message is required to be received or sent by said remote server before a subsequent message is able to be transmitted or received, and wherein that portion of the computer network interfaced with the IM server is prone to latency and instability; the computer network including:

a buffer server interconnected with the remote server using a sequential message handshaking protocol corresponding to that used by the remote server, wherein the interconnection provides for the communication of messages between the buffer server and the remote server in steady, timed flows with minimal latency and connection disruptions; the buffer server also being interconnected with the IM server using a protocol compatible therewith in a manner where message handshaking is not required to be performed sequentially and thus accommodate higher latency and instability problems with the computer network;

and wherein the buffer server is optimally connected relative to both the IM server and the remote server so as to maximise message throughput. Preferably, the buffer server is connected via a direct electronic link to the remote server so as to ensure the communication of messages between the buffer server and the remote server in steady, timed flows with minimal latency and connection disruptions.

Alternatively, if the remote network is located in a highly reliable internet exchange with a highly reliable internet infrastructure, the buffer server may be located in close proximity to the remote server and be connected via the highly reliable internet exchange and infrastructure to the remote server.

In accordance with another aspect of the present invention, there is provided an instant messaging system comprising:

an IM server having a plurality of clients with IM client applications of the same or different types;

a remote server to which at least one of the clients is connected;

a computer network interconnecting the IM server and the remote server to provide IM communications therebetween and wherein that portion of the computer network interfaced with the IM server is prone to latency and instability;

the remote server utilising a sequential message handshaking protocol for transmitting and receiving messages to and from the IM server, whereby a confirmation of the successful transmission or receipt of a message is required to be received or sent by the remote server before a subsequent message is able to be transmitted or received;

a buffer server interconnected with the remote server using a sequential message handshaking protocol corresponding to that used by the remote server, the interconnection providing for the communication of messages between the buffer server and the remote server in steady, timed flows with minimal latency and connection disruptions;

the buffer server also being interconnected with the IM server using a protocol compatible therewith in a manner where message handshaking is not required to be performed sequentially to accommodate higher latency and instability of the computer network therebetween; and the buffer server being optimally connected relative to both the IM server and the remote server so as to maximise message throughput.

Preferably, in either aspect of the invention, the buffer server is connected via a direct electronic link to the remote server so as to ensure the communication of messages between the buffer server and the remote server in steady, timed flows with minimal latency and connection disruptions.

Alternatively, in either aspect of the invention, if the remote network is located in a highly reliable internet exchange with a highly reliable internet infrastructure, the buffer server may be located in close proximity to the remote server and be connected via the highly reliable internet exchange and infrastructure to the remote server.

Preferably, in either aspect of the invention, the remote server is an SMSC server of a GSM network and the client types connected to the SMSC server have SMS capability that is controlled and managed by the SMSC server to provide for SMS there between and instant messaging between the SMSC server and the IM server.

Preferably, in either aspect of the invention, the computer network interconnecting the IM server and the buffer server is the internet.

Preferably, in either aspect of the invention, the IM server is located within a tier 1 internet exchange.

Preferably, in either aspect of the invention, the computer network interconnecting the buffer server and the romote server or host is a direct electronic link.

Preferably, in either aspect of the invention, the IM server is interconnected to a plurality of remote servers via the computer network, each remote server utilising a sequential message handshaking protocol for transmitting and receiving messages with the IM server, whereby a buffer server is associated with and dedicated to each remote server.

Preferably, in either aspect of the invention, said client types connected to the computer network via the GSM network have SMS capability and are initially connected via an SMSC server to control and manage said SMS therebetween, and wherein said SMSC server is directly connected to said IM server via said computer network.

Preferably, in either aspect of the invention, the IM server is provided with a communication buffer mirrored to the buffer of said buffer server of the remote network, and each buffer comprises a circular array to contain the messages currently being processed by the instant messaging system at any one time, and wherein a plurality of statuses are recorded against each message to indicate its particular stage of communication between the IM server and the SMSC server.

Preferably, in either aspect of the invention, each said buffer is provided with synchronization means to reconstruct messages that may have been lost in transit between the communication buffer of the IM server and the buffer server at the remote server as a result of an extended interruption to the computer network linking the same. Preferably, in either aspect of the invention, the synchronization means reconstructs messages from said circular array having regard to the statuses of the current messages being processed by the instant messaging system In accordance with another aspect of the present invention, there is provided a method for instant messaging between a plurality of clients connected to a centralised IM server, one client having an IM application provided via a remote network connected to the IM server via a computer network and a remote server, and the remote server utilising a sequential message handshaking protocol for transmitting and receiving messages to and from the IM server, whereby a confirmation of the successful transmission or receipt of a message is required to be received or sent by said remote server before a subsequent message is able to be transmitted or received and wherein that portion of the computer network interfaced with the IM server is prone to latency and instability; the method comprising:

buffering communications with that portion of the computer network interfaced with the remote server and using a sequential handshaking protocol corresponding to that used by the remote server, so that the communication of messages with the remote server is provided in steady, timed flows with minimal latency and connection disruptions;

simultaneously buffering communications with that portion of the computer network interfaced with the IM server using a communication protocol compatible therewith in a manner where message handshaking is not required to be performed sequentially thereby accommodating higher latency and instability that may be associated with that portion of the computer network; and performing the buffering in a manner so as to maximise message throughput. Preferably, the buffering is performed via a direct electronic link to the remote server so as to ensure the communication of messages between the buffer server and the remote server in steady, timed flows with minimal latency and connection disruptions.

Alternatively, if the remote network is located in a highly reliable internet exchange with a highly reliable internet infrastructure, the buffering may be performed in close proximity to the remote server and via the highly reliable internet exchange and infrastructure to the remote server.

BRIEF DESCRIPTION OF THE DRAWINGS

The invention will be better understood in the light of the following description of one specific mode thereof. The description is made with reference to the accompanying drawings, wherein.

MODE FOR CARRYING OUT THE INVENTION

The preferred embodiment of the mode of the invention is directed towards an instant messaging ("IM") system and a method of instant messaging, whereby the IM system comprises an IM server to which a number of users or clients may be selectively connected via the internet or direct electronic links. More particularly the embodiment is concerned with the computer network interconnecting a plurality of remote servers of a GSM mobile phone network having SMS capability with the IM server.

In the present embodiment, the remote server is an SMSC server that controls and manages the SMS of one or more GSM networks and wherein the SMSC allows for the communication of instant messages between the IM server and a mobile phone user of the GSM network.

The basic functions of the IM system, ie the basic actions it can undertake on behalf of a user, consist of sending and receiving instant messages and detecting users who are "online", i.e., connected to the internet or otherwise accessible by instant messaging right at, or around, that particular moment in time. Users are also referred to as "buddies" in the IM system. There can be no absolute assurance that a user is actually online or reachable at a given moment by instant messaging due to the less than perfect stability of the internet and GSM networks, mobility of the GSM subscriber, and so on.

The IM server system is designed to undertake any of the aforementioned basic actions if triggered or instructed to do so by the particular appliance of the client accessing the IM server. This triggering occurs when the client appliance sends an electronic prompt or command to the IM server. A PC-based application will do this by sending commands to the IM server via an electronic or internet link. A GSM device will do this by sending an SMS message to the IM server via the SMSC of the GSM network of which it is part and the computer network interconnecting the SMSC server and the IM server. The format of the delivered information, such as the actual message or notification of who is online, necessarily depends on the appliance type and thus in the case of a GSM device will be in SMS format.

In a GSM-based client, a GSM device such as a mobile phone is the terminal or appliance, and the user of this device operates it as a subscriber to the GSM network where telecommunications between subscribers are transmitted wirelessly through GSM cellular sites disposed to create a cellular network.

A subscriber-to-subscriber SMS message on a GSM network includes an information packet comprising the sender's numeric address (the GSM mobile phone number of the sender), the target recipient's numeric address (typically the GSM mobile phone number of the receiver), the GSM mobile number of the SMSC server which will process the message, and as much as a 160-character message.

The SMSC server controls and manages the transmission of all SMS messages between subscribers. The SMSC server includes a database of all SMS subscribers and stores SMS information packets sent by subscribers for subsequent downloading by targeted recipients when the GSM device of a recipient is switched on and is within a cell.

The SMSC server may be connected to the IM server via a direct electronic link or the internet. In the present embodiment it is connected by way of a computer network comprising a combination of the two. Thus messages or short messages can be sent via the computer network from the IM server to the SMSC server for subsequent delivery to subscribers of SMS on the GSM network and vice versa. Short messages are sent and received between the IM server and the SMSC server using the GSM network's message protocol. In the present mode, the particular protocol used is CIMD2. The system, however, can support other protocols such as Simple Message Paging Protocol ("SMPP").

These protocols are characterised by sequential message handshaking whereby a confirmation of the successful transmission or receipt of a message is required to be received or sent by the SMSC server before a subsequent message is able to be transmitted or received.

Figure 1:
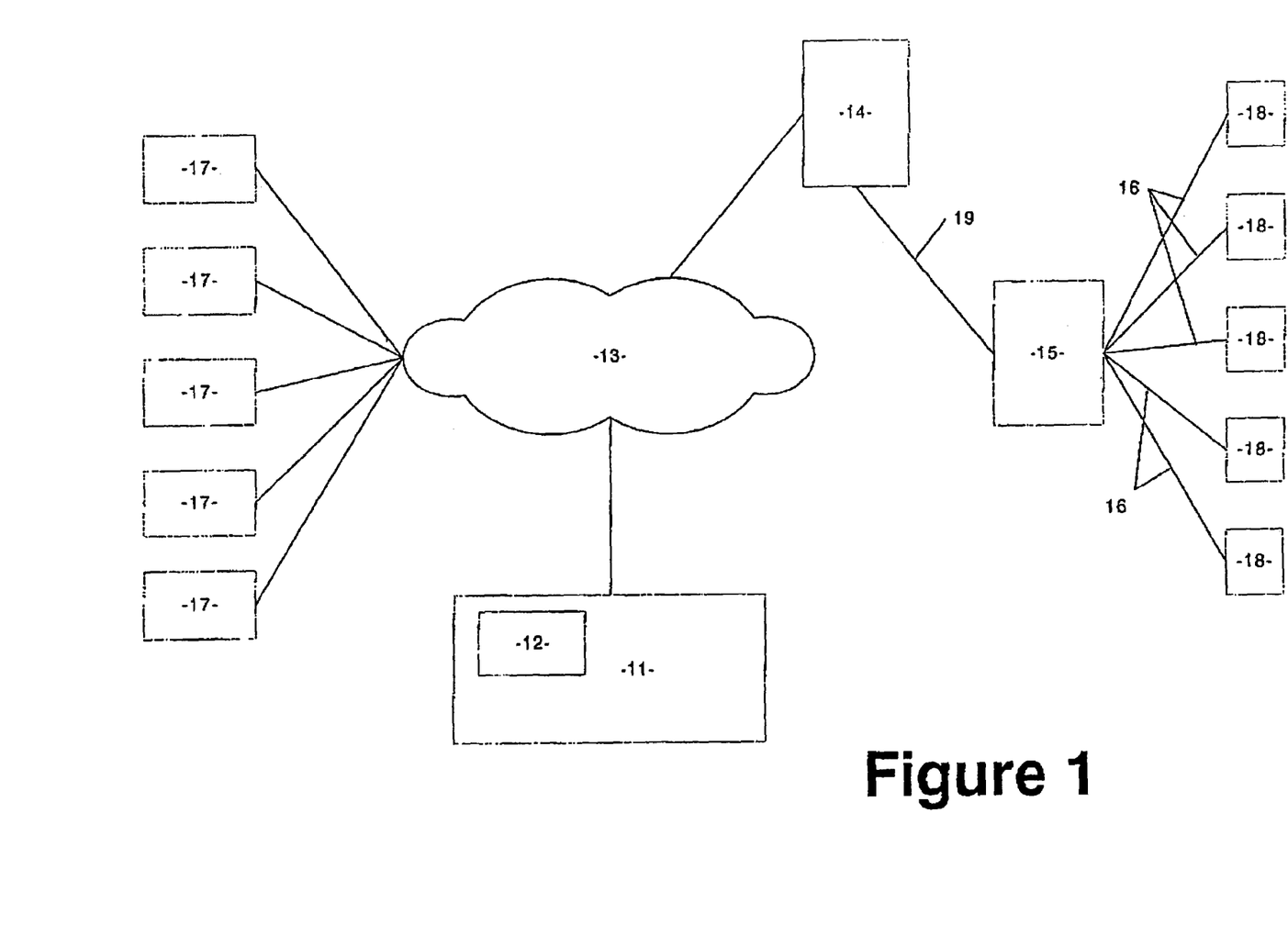
FIG. 1 is a schematic block diagram showing the embodiment of the IM system with the IM server connected to a plurality of SMSC servers of one or more GSM networks via a computer network incorporating buffer servers and the internet.

Now describing the configuration of the present embodiment in more detail, as shown in FIG. 1 of the drawings, the IM system comprises an IM server 11 having a communication buffer 12, which is connected to part of a computer network comprising the internet 13. The communication buffer 12 is a process or program construct that forms a buffer array inside the same computer system constituting the IM server 11. The IM server 11 is physically located to interface directly with a tier 1 internet exchange so that it will be close to a large amount of internet traffic providing high reliability and redundancy of internet access.

An SMSC buffer server 14 is located proximate to an SMSC server 15 of a remote GSM carrier network 16. The SMSC buffer server 14, on one side, is connected to the internet 13 and on the other side is directly connected via an electronic link 19 to the SMSC server 15.

Thus the computer network linking the IM server 11 to the SMSC server 15 comprises a combination of the internet 13 and the direct electronic link 19, and is interfaced with the IM server 11 by means of the communication buffer 12 and the SMSC server 15 by means of the SMSC buffer server 14.

Clients in the form of PC users 17 (and other users of the IM system) connect to the IM server 11 primarily through the internet 13. Clients in the form of GSM devices 18, however, connect to the SMSC server 15 to exchange messages, which in turn is directly connected with the SMSC buffer server 14, and it is the SMSC buffer server 14 that connects to the IM server 11 via the internet 13.

Whilst the interface of the communication buffer 12 with the internet 13 is quite reliable due to the positioning of the IM server 11 in a tier 1 internet exchange, this is not necessarily so with the interface of the SMSC buffer server 14 to the internet 13. If the location of the SMSC server 15 and GSM network 16 is remote from the IM server 11 and not in a tier 1 internet exchange, which is the case in the present embodiment, then the connection to the internet 13 can be quite unstable and suffer high latency.

The way messages are handled by the communication buffer 12 and remote buffer server 14 is crucial to minimising the effects of latency with the computer network. The SMSC buffer server 14 is configured to use a corresponding sequential message handshaking protocol to that used by the SMSC server 15 so that the SMSC buffer server exchanges SMS instant messages with the SMSC server 15 with each message requiring confirmation that it has been received by either the SMSC server 15 from the SMSC buffer server 14 or the SMSC buffer server 14 from the SMSC server 15, before the next message can be sent. Although this would create a major speed problem if directly connected to the internet which has intrinsic latency and stability problems, since the SMSC buffer server 14 is connected directly to or co-located with the SMSC server 15, latency and connection disruptions between the two are kept to a minimum.

On the other hand, the exchange of messages or SMS between the communication buffer 12 and the SMSC buffer server 14 does not require sequential message per message confirmation before any new messages can be sent or exchanged. Though message confirmations are still required, for message tracking purposes, the confirmations can come at random, as opposed to sequentially.

Consequently, the SMSC buffer server 14 is also configured to connect to the IM server 11 via the internet 13 using a protocol that permits messages to be sent off and received in streams or batches to or from the IM server 11 and which does not require message handshaking to be performed sequentially between each message transmitted and received.

The SMSC buffer server 14 is also provided with a buffer memory to store up to 255 SMS instant messages of up to 160 characters each to accommodate typical latency and instability problems associated with the internet. By virtue of this facility, the SMSC buffer server 14 can simply store each message it receives from the SMSC server 15 and provide the sequential handshaking confirmation that is required with each message, thereby minimising the delay that arises with the communication of messages between the SMSC server 15 and the SMSC buffer server 14. It can also rapidly send messages from the buffer memory to the IM server 11 concurrently or once connection is established or re-established with the internet, without having to concern itself with message receipt confirmations and thus not be unduly delayed or affected by latency and instability issues associated with the internet.

Likewise, the buffer memory of the SMSC buffer server 14 is sized to store up to 255 instant messages of 160 characters each received from the communication buffer 12 of the IM server 11 to accommodate different speeds in the transfer of messages from the SMSC buffer server 14 to the SMSC server 15. The need for buffering at this end arises not from latency and stability issues associated with the link to the SMSC server 15, as the need for high stability and low latency of this part of the link is the essence of the invention, but rather due to the sequential message handshaking requirement of the SMSC server, whereby the rate of transfer of messages between the buffer server and the SMSC server is dictated by the speed of processing the messages by the SMSC server. Thus the speed of communications between the SMSC buffer server 14 and the SMSC server 15 is quite independent of the speed of communications between the communication buffer 12 and the SMSC buffer server 14, and can at times be much slower than the latter, hence the need for buffering at both interfaces of the buffer server 14 with the computer network.

Although sequential message handshaking is not required between the communication buffer 12 and the SMSC buffer server 14, message tracking is nonetheless very crucial for high performance delivery. Hence, the IM system must know the status of each message going through the system and must ensure minimal message loss if at all. In case the internet connection between the buffer servers gets interrupted, the SMSC buffer server 14 and the communication buffer 12 have synchronization features, enabling the effective reconstruction of messages, which could have been lost. This feature will be discussed later.

For illustration, the following describes the flow of a message from a PC user 17 to a GSM device user 18.

A message is sent to the IM server system 11 via the internet 13, The IM server 11 relays the message through its own communication buffer 12 to the SMSC buffer server 14, via the internet 13. The IM server 11 can continue to send more messages to the SMSC buffer server 14 without waiting for confirmation that the SMSC buffer server 14 has received the last message successfully.

Immediately the SMSC buffer server 14 receives a message, it stores it in its buffer memory. As soon as a message is stored in its buffer memory, the SMSC buffer server sends the oldest message stored to the SMSC server 15. The SMSC server 15 confirms the receipt of the message or SMS by sending the SMSC buffer server 14 a confirmation. This confirmation is necessary before the next oldest stored message can be transmitted to the SMSC server 15 by the SMSC buffer server 14. Due to the fact that the SMSC buffer server 14 is co-located or directly connected via the electronic link 19 to the SMSC server 15, the exchange of messages between the two occurs with minimal latency and interruption, as compared to a pure internet connection.

A similar process takes place for messages sent by the user of a GSM device 18 to a PC user 17. The user of the GSM device 18 composes a message or SMS that is then transmitted to the SMSC server 15. Upon recognizing that the message is meant for a user of the IM system, the SMSC server 15 relays the message to the SMSC buffer server 14. As with messages sent to the SMSC server 15 by the SMSC buffer server 14, the SMSC buffer server 14 must likewise confirm the receipt of the message before it can receive any new messages from the SMSC server 15.

The SMSC buffer server 14 transmits the message to the IM server 11 via the internet 13 through the mirror communication buffer 12. The SMSC buffer server 14 can continue to send more messages to the IM server 11 since their exchange of messages with the corresponding communication buffer server 12 does not require sequential message per message confirmation before new messages can be transmitted. Eventually, the IM server 11 transmits the message to the intended PC user recipient 17 via the internet 13.

Figure 2:
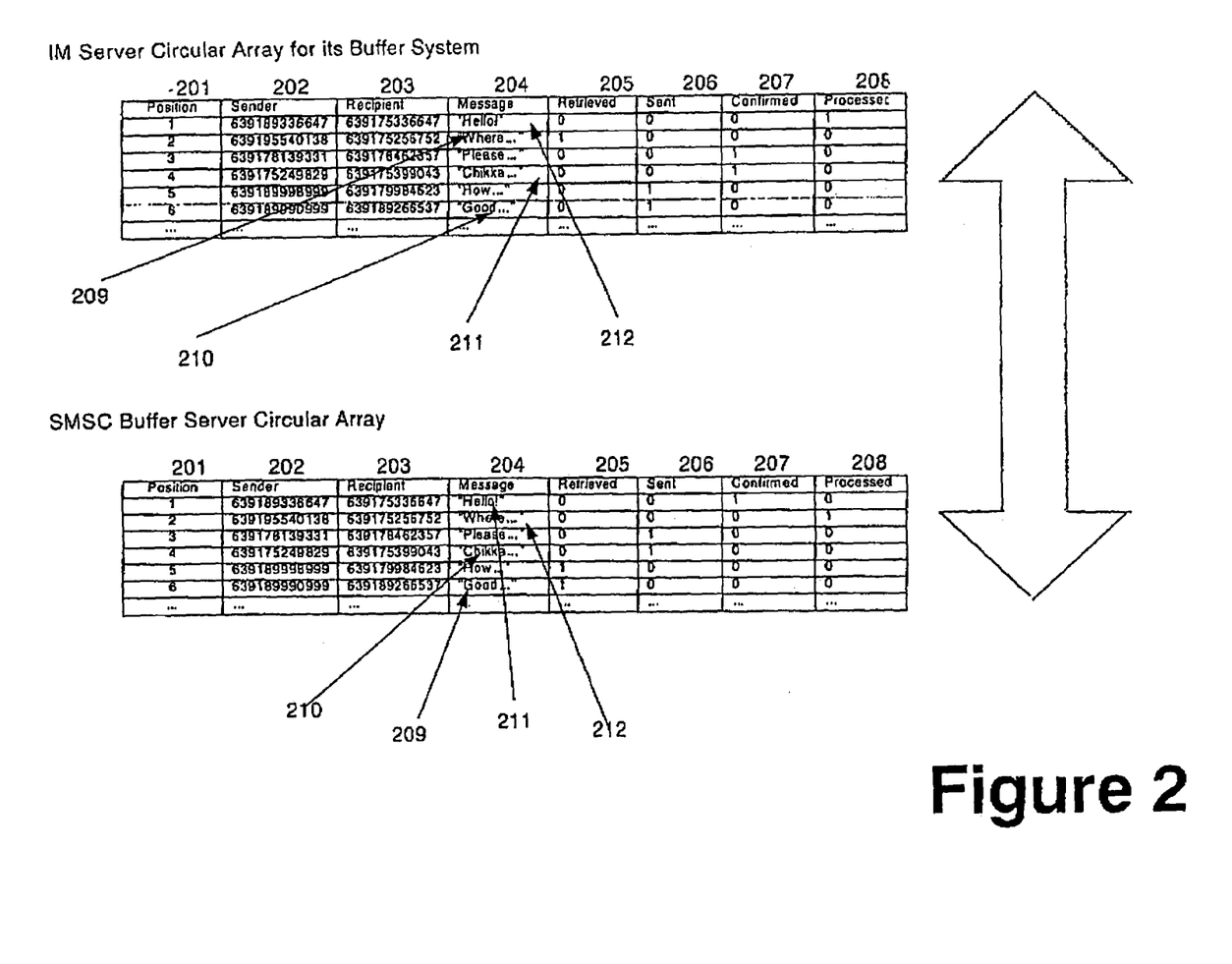
FIG. 2 is a schematic diagram showing the circular array structures that reside in the communication buffer of the IM server and the buffer server of the remote server.

The communication buffer 12 and the SMSC buffer server 14 possess circular arrays containing the messages that are presently being processed by the IM system. FIG. 2 illustrates the circular array structure that resides in each of the buffer servers. Essentially the two circular arrays mirror each other, i.e. the same messages reside (or eventually get stored) in the same position in the other array. Sometimes, however, the arrays can be out of synchronization for a protracted period of time. This situation may occur when the internet connection between the two buffer servers gets interrupted for an extended period. If this happens the IM system can reconstruct the messages that may have been lost in transit.

Each data element in the circular array contains the following information: sender 202, recipient 203, the message 204, its address 201 within the circular array, and special flags 205-208. The array resides in the random access memory (RAM) of the computer for each buffer server (or the hard drive, to the extent that the RAM becomes filled).

Each data element in the circular array, or message for that matter, has a special flag that says any one of the following: Retrieved 205, Sent 206, Confirmed 207, and Processed 208. Also, each circular array has four "pointers" or indices: Last Message Retrieved 209 (Last Retrieved), Last Message Sent 210 (Last Sent), Last Message Confirmed 211 (Last Confirmed), and Last Message Processed 212 (Last Processed). These indices point to elements or particular addresses in the circular arrays as suggested by the labels.

The processing of a message sent from the IM server 11 to a GSM device 18 takes place as follows.

The communication buffer 12 "retrieves" the message waiting on queue, having been recently sent by a PC user 17. This message is marked retrieved with the "last retrieved" pointer updated accordingly. The communication buffer 12 "sends" the message to the SMSC buffer server 14. The communication buffer 12 flags this message on the array as "Sent" and the "last sent" pointer is updated accordingly.

Once the SMSC buffer server 14 successfully receives the message, it stores it in its own array and sends an acknowledgement back to the communication buffer 12 whereby on receipt, the message is tagged "Confirmed" on the communication buffer 12 and the "last confirmed" pointer is updated accordingly.

Finally, the SMSC buffer server 14 notifies the communication buffer 12 that the GSM device 18 through the SMSC server 15 has successfully received the message. At this point, the message will be tagged "Processed" on the communication buffer 12 and the "last processed" pointer updated accordingly, which also means that the communication buffer 12 is ready to accept a new message in that particular location in its array.

While this is happening, the communication buffer 12 may continue receiving additional messages, storing each in addresses within the array and whose "Processed" flag is turned on.

The processing of a message sent from the SMSC buffer server 14 to the PC user 17 takes place as follows. The SMSC buffer server 14 "retrieves" the message waiting on queue at the SMSC server 15, having been recently sent by a GSM device 18. The SMSC buffer server 14 "sends" the message to the communication buffer 12. The SMSC buffer server 14 flags this message on the array as "Sent".

Once the communication buffer 12 successfully receives the message, it sends an acknowledgement to the SMSC buffer server 14, whereby on receipt the message is tagged as "Confirmed" on the SMSC buffer server 14.

Finally, the communication buffer 12 notifies the SMSC buffer server 14 that the message has been successfully sent to the PC user 17 or is queued in the "message inbox" of the PC user 17. At this point, the message will be tagged "Processed" on the SMSC buffer server 14, which also means that the SMSC buffer server 4 is ready to accept a new message in that particular location in its array.

While this is happening, the SMSC buffer server 14 may continue receiving additional messages from the SMSC server 15, storing each in addresses within the array whose "Processed" flag is turned on. However, the SMSC buffer server 14 can only "retrieve" one message at a time from the SMSC server 15, only after it tells the SMSC server 15 that it has successfully "retrieved" the previous message sent. Notwithstanding this, since the SMSC buffer server 14 has a direct electronic link 19 to (or is co-located with) the SMSC server 15, this message confirmation loop can occur relatively quickly, with minimal latency as compared to a pure internet connection.

In the same manner as described in the IM server to GSM device procedure, the "last x" pointers, where x can be "sent", "received", "confirmed" or "processed" are continuously updated. Every operation successfully carried out will merit a corresponding change in one of the pointers. This ensures an active circular buffer whose slots are constantly re-used and gives the system the ability to recover from an interruption in the internet connection.

Figure 3:
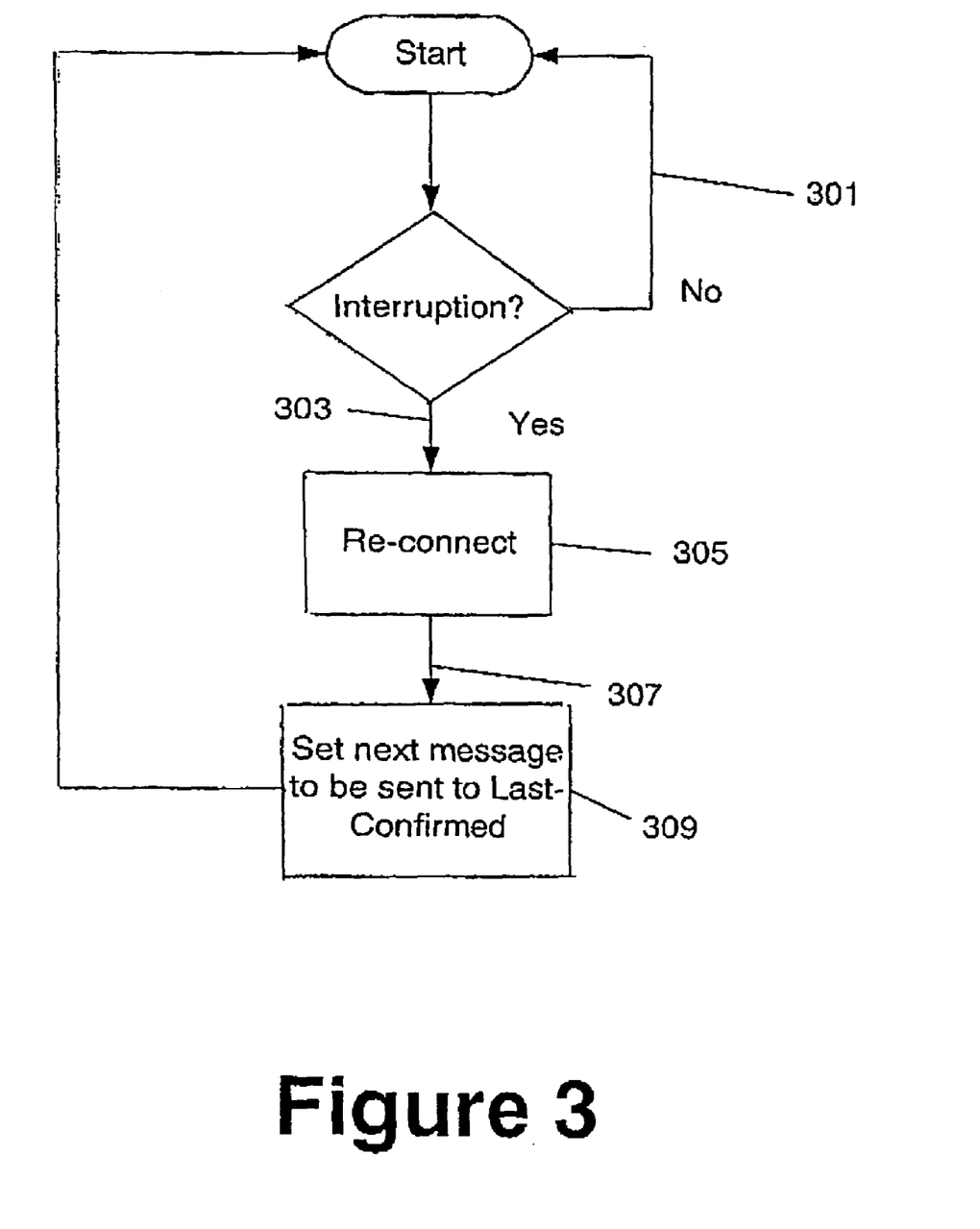
FIG. 3 is a logic flow diagram showing the synchronisation procedure.

The system includes synchronization means to reconstruct messages that may have been lost in transit should an extended interruption of the internet connection between the buffer servers takes place. The synchronization means is in the form of a routine programmed into the IM server 11/communication buffer 12 and the SMSC buffer server 14. The logic flowchart of the algorithm for this synchronization means is shown in FIG. 3 of the drawings.

The routine causes the communication buffer 12 and the buffer server 14 to monitor its respective connection with the internet 13 as represented by program loop 301. Once either of the buffers detects an extended interruption 303, the buffers try to reconnect 305 (though they would still continue to receive/retrieve messages from the two ends of the IM system—the IM server 11 from various PC users 17, and the SMSC buffer server 14 from the users of the GSM devices 18 via the SMSC server 15). Once connection has been re-established 307, the buffers resend messages 309 from the "Last Confirmed" pointer up until the "Last Sent" pointers. Hence, messages that may have been lost during the internet connection interruption will be reconstructed/retransmitted.

It should be appreciated that the scope of the present invention is not limited to the specific mode and the embodiment thereof described herein. Accordingly, changes and improvements to the embodiment that amount to no more than common general knowledge are not considered to depart from the spirit or scope of the invention.

The invention claimed is:

1. In an instant messaging (IM) system comprising: an IM server having a plurality of clients, one or more of the clients with IM client applications of the same types and one or more of the clients with IM client applications of different types, a Short Message Service Center (SMSC) server to which at least one of the clients is connected, a computer network interconnecting the IM server and the SMSC server to provide IM communications therebetween, wherein the SMSC server utilizes a sequential message handshaking protocol for transmitting and receiving messages to and from the IM server, whereby a confirmation of the successful transmission or receipt of a message is required to be received or sent by said SMSC server before a subsequent message is able to be transmitted or received, and wherein that portion of the computer network interfaced with the IM server is prone to latency and instability; the computer network including:

a buffer server configured to store and transmit messages between the SMSC server and the IM server, the buffer server interconnected with the SMSC server using a sequential message handshaking protocol corresponding to that used by the SMSC server, wherein the interconnection provides for the communication of messages between the buffer server and the SMSC server in steady, timed flows with minimal latency and connection disruptions;

said buffer server also being interconnected with the IM server using a protocol compatible therewith in a manner where message handshaking is not required to be performed sequentially and thus accommodate higher latency and instability problems with the computer network therebetween.

2. An instant messaging (IM) system comprising:

an IM server having a plurality of clients, one or more of the clients with IM client applications of the same types and one or more of the clients with IM client applications of different types;

a Short Message Service Center (SMSC) server to which at least one of said clients is connected;

a computer network interconnecting said IM server and said SMSC server to provide IM communications therebetween and wherein that portion of the computer network interfaced with the IM server is prone to latency and instability;

said SMSC server utilizing a sequential message handshaking protocol for transmitting and receiving messages to and from the IM server, whereby a confirmation of the successful transmission or receipt of a message is required to be received or sent by said SMSC server before a subsequent message is able to be transmitted or received;

a buffer server configured to store and transmit messages between the SMSC server and the IM server, the buffer server interconnected with said SMSC server using a sequential message handshaking protocol corresponding to that used by said SMSC server, the interconnection providing for the communication of messages between said buffer server and said SMSC server in steady, timed flows with minimal latency and connection disruptions;

said buffer server also being interconnected with the IM server using a protocol compatible therewith in a manner where message handshaking is not required to be performed sequentially to accommodate higher latency and instability of the computer network therebetween.

3. The invention as claimed in claim 1 or 2, wherein the buffer server is co-located with the SMSC server, and connected thereto via a direct electronic link so as to ensure the communication of messages between the buffer server and the SMSC server in steady, timed flows with minimal latency and connection disruptions.

4. The invention as claimed in claim 1 or 2, wherein if the SMSC server is located in a highly reliable internet exchange with a highly reliable internet infrastructure, the buffer server is connected via the highly reliable internet exchange and infrastructure to the SMSC server.

5. The invention as claimed in claim 1 or 2, wherein said SMSC server is an SMSC server of a Global System for Mobile communications (GSM) network and said client types connected to the SMSC server have Short Messaging Service (SMS) capability that is controlled and managed by said SMSC server to provide for SMS there between and IM between the SMSC server and the IM server.

6. The invention as claimed in claim 1 or 2, wherein said sequential message handshaking protocol is the Computer Interface to Message Distribution 2 protocol (CIMD2).

7. The invention as claimed in claim 1 or 2, wherein said computer network interconnecting said IM server and said buffer server is the internet.

8. The invention as claimed in claim 7, wherein the IM server is located within a tier 1 internet exchange.

9. The invention as claimed in claim 1 or 2, wherein the IM server is interconnected to a plurality of SMSC servers via the computer network, each SMSC server utilizing a sequential message handshaking protocol for transmitting and receiving messages with the IM server, whereby said buffer server is associated with and dedicated to each SMSC server.

10. The invention as claimed in claim 1 or 2, wherein the messages are communicated as streaming data between said buffer server and the SMSC server in well-defined time increments or cycles or sporadically depending on when the messages become available to send.

11. The invention as claimed in claim 1 or 2, wherein the buffer server has sufficient memory to buffer up to 255 instant messages received from the SMSC server to accommodate latency and instability problems associated with the computer network connection to the IM server.

12. The invention as claimed in claim 1 or 2, wherein the IM server is provided with a communication buffer mirrored to the buffer of said buffer server of the SMSC server and wherein the buffer server has sufficient memory to buffer up to 255 instant messages received from the communication buffer to accommodate different communication speeds between the buffer server and the SMSC server.

13. The invention as claimed in claim 1 or 2, wherein the IM server is provided with a communication buffer mirrored to the buffer of said buffer server of the SMSC server, and each buffer comprises a circular array to contain the messages currently being processed by the instant messaging system at any one time, and wherein a plurality of statuses are recorded against each message to indicate its particular stage of communication between the IM server and the SMSC server.

14. The invention as claimed in claim 1 or 2, wherein the IM server is provided with a communication buffer mirrored to the buffer of said buffer server of the SMSC server, and each said buffer is provided with synchronization means to reconstruct messages that may have been lost in transit between the buffers as a result of an extended interruption to the computer network linking the same.

15. The invention as claimed in claim 13, wherein each said buffer is provided with synchronization means to reconstruct messages that may have been lost in transit between the buffers as a result of an extended interruption to the computer network linking the same, and wherein said synchronization means reconstructs messages from said circular array having regard to the statuses of the current messages being processed by the instant messaging system.

16. A method for instant messaging (IM) between a plurality of clients connected to a centralized IM server, wherein one or more of the clients use an IM system different than one or more other of said clients, one client having an IM application provided via a remote network connected to the IM server via a computer network and a Short Message Service Center (SMSC) server, and the SMSC server utilizing a sequential message handshaking protocol for transmitting and receiving messages to and from the IM server through a buffer server configured to store and transmit messages between the SMSC server and the IM server, whereby a confirmation of the successful transmission or receipt of a message is required to be received or sent by said SMSC server before a subsequent message is able to be transmitted or received and wherein that portion of the computer network interfaced with the IM server to the buffer server is prone to latency and instability; the method comprising:

buffering communications with that portion of the computer network interfaced with the SMSC server and using a sequential handshaking protocol corresponding to that used by the SMSC server, so that the communication of messages with the SMSC server is provided in steady, timed flows with minimal latency and connection disruptions;

simultaneously buffering communications with that portion of the computer network interfaced with the IM server using a communication protocol compatible therewith in a manner where message handshaking is not required to be performed sequentially thereby accommodating higher latency and instability that may be associated with that portion of the computer network; and performing the buffering in a manner so as to maximize message throughput.

17. A method as claimed in claim 16, wherein the buffering is performed via a direct electronic link to the SMSC server, where the SMSC server is co-located with the buffer server, so as to ensure the communication of messages between the buffer server and the SMSC server in steady, timed flows with minimal latency and connection disruptions.

18. A method as claimed in claim 16, wherein if the remote network is located in a highly reliable internet exchange with a highly reliable internet infrastructure, the buffering may be performed via the highly reliable internet exchange and infrastructure to the SMSC server.

* * * * *